United States Patent
Freedman et al.

(10) Patent No.: US 7,693,068 B2
(45) Date of Patent: Apr. 6, 2010

(54) SYSTEMS, METHODS, AND COMPUTER PROGRAM PRODUCTS FOR PROVIDING A DISTRIBUTED HARDWARE PLATFORM INTERFACE (HPI) ARCHITECTURE

(75) Inventors: Steven M. Freedman, Raleigh, NC (US); Laurie J. Blackburn, Raleigh, NC (US); Michael J. Wands, Apex, NC (US); Huyen L. Nguyen, Raleigh, NC (US); Robert J. Tomasko, Cary, NC (US); Robert K. Bubnis, Raleigh, NC (US); Andrew A. Joslin, Morrisville, NC (US); John A. Crosson, Raleigh, NC (US)

(73) Assignee: Tekelec, Morrisville, NC (US)

( * ) Notice: Subject to any disclaimer, the term of this patent is extended or adjusted under 35 U.S.C. 154(b) by 588 days.

(21) Appl. No.: 11/594,013

(22) Filed: Nov. 7, 2006
(Under 37 CFR 1.47)

(65) Prior Publication Data

US 2008/0107032 A1    May 8, 2008

(51) Int. Cl.
*H04L 12/26* (2006.01)
(52) U.S. Cl. .................... 370/236.2; 709/223
(58) Field of Classification Search ........... None
See application file for complete search history.

(56) References Cited

U.S. PATENT DOCUMENTS

| | | | | |
|---|---|---|---|---|
| 6,047,280 A | * | 4/2000 | Ashby et al. ............ | 707/2 |
| 6,047,338 A | * | 4/2000 | Grolemund ............. | 710/33 |
| 7,283,532 B2 | * | 10/2007 | Hassan-Ali et al. .... | 370/395.42 |
| 7,289,436 B2 | * | 10/2007 | Schaller et al. ......... | 370/225 |
| 2005/0196120 A1 | * | 9/2005 | Colombo et al. ....... | 385/135 |
| 2006/0088059 A1 | * | 4/2006 | Lim et al. ............... | 370/469 |
| 2007/0157158 A1 | * | 7/2007 | McKinley ............... | 717/101 |
| 2008/0010315 A1 | * | 1/2008 | McKinley ............... | 707/104.1 |
| 2008/0216064 A1 | * | 9/2008 | Braswell ................. | 717/149 |

OTHER PUBLICATIONS

Service Ability Forum, Inc., "Service Ability Forum Hardward Platform Interface," Specification SAI-HPI-B.01.01 (2004).

* cited by examiner

*Primary Examiner*—Min Jung
(74) *Attorney, Agent, or Firm*—Jenkins, Wilson, Taylor & Hunt, P.A.

(57) ABSTRACT

Systems, methods, and computer program products for providing a distributed hardware platform interface (HPI) architecture are disclosed. According to one aspect, the subject matter described herein includes a system for providing distributed operations, administration, and maintenance (OAM) functionality in a multi-shelf processing environment. The system includes a first shelf that includes first hardware components, a second shelf that includes second hardware components, and an OAM module for providing an OAM function. The system also includes a first hardware platform interface (HPI) daemon for communicating OAM-related information between the first hardware components and the OAM module, and a second HPI daemon for communicating OAM-related information between the second hardware components and the OAM module.

50 Claims, 3 Drawing Sheets

SYSTEMS, METHODS, AND COMPUTER PROGRAM PRODUCTS FOR PROVIDING A DISTRIBUTED HARDWARE PLATFORM INTERFACE (HPI) ARCHITECTURE

TECHNICAL FIELD

The subject matter described herein relates to providing operations, administration, and maintenance (OAM) functionality in a distributed, multi-shelf processing environment. More particularly, the subject matter described herein relates to systems, methods, and computer program products for providing a distributed hardware platform interface (HPI) architecture.

BACKGROUND

In a processing system that includes multiple shelves, where each shelf includes multiple processing cards, an operations, administration, and maintenance (OAM) subsystem is typically employed to monitor and control the various hardware and software components present in the processing system. The functions of an OAM subsystem may for example include identifying and configuring hardware and/or software components present in the system, monitoring the status, events, and alarms associated with those components, and detecting a change made to the processing system, such as addition and removal, and activation and deactivation of those components. The OAM subsystem may include a graphical user interface (GUI), command line interface (CLI), or both, through which the processing system may be monitored and controlled.

An OAM subsystem architecture may use the Hardware Platform Interface (HPI), an interface standard defined by the Service Availability Forums (SAF). HPI provides a universal interface for platform management, including hardware sensor monitoring and control. HPI provides an abstracted interface to managing computer hardware, typically for chassis- and rack-based servers. HPI includes an abstract C programming language library interface for hardware monitoring, control, and management. The HPI standard interface supports resource modeling; access to and control over sensor, control, watchdog, and inventory data associated with resources; abstracted system event log interfaces; hardware events and alerts; and a managed hotswap interface. HPI provides a modular mechanism for adding new hardware and device support easily. The HPI-based architecture includes an HPI daemon, or background process, where the HPI daemon is a user of the HPI library that provides HPI as a system service. Other processes that wish to communicate with the HPI daemon may make use of a provided HPI client side library.

A centralized HPI daemon communicates with all shelves and cards that comprise the system. It also communicates with any number of OAM software processes. The centralized HPI daemon may read the configuration information, such as the number of shelves in the system, from a configuration file at start-up. The centralized HPI daemon may not have the capability to allow the user to specify its IP address and port via a command line argument, but instead may require the user to define system environment variables prior to starting the daemon; at initialization, the daemon may read these system environment variables to determine its assigned IP address and port.

FIG. 1 is a block diagram illustrating a conventional OAM subsystem architecture. A multi-shelf, centralized HPI processing system 100 includes shelves 102, each of which may contain one or more cards 104, which may perform various functions. An HPI daemon 106 communicates OAM-related information with all shelves in system 100. System 100 may contain OAM software processes, such as process 1 108 and process 2 110. HPI daemon 106 acts as the interface between OAM software processes and the hardware components in the system, communicating OAM-related information between the processes and the hardware components.

There are disadvantages associated with a conventional implementation of the current HPI standard. One disadvantage is that a single, centralized HPI daemon becomes a significant bottleneck for OAM-related traffic in system 100. Another disadvantage associated with the conventional implementation is that centralized HPI daemon 106 must be taken out of service or rebooted whenever a new shelf is added to system 100, because HPI daemon 106 reads the updated configuration file including information about the new shelf only upon a start or restart. Where all shelves in an OAM subsystem rely on the same HPI daemon, whenever a shelf is added to, or removed from, system 100, all shelves are taken out of service while HPI daemon 106 restarts.

Accordingly, in light of these disadvantages associated with OAM subsystem architectures based upon the conventional implementation of the current HPI standard, there exists a need for a distributed HPI architecture.

SUMMARY

According to one aspect, the subject matter described herein includes a system for providing distributed operations, administration, and maintenance (OAM) functionality in a multi-shelf processing environment. The system includes a first shelf that includes first hardware components, a second shelf that includes second hardware components, and an OAM module for providing an OAM function. The system also includes a first hardware platform interface (HPI) daemon for communicating OAM-related information between the first hardware components and the OAM module and a second HPI daemon for communicating OAM-related information between the second hardware components and the OAM module.

According to another aspect, the subject matter described herein includes a system for providing distributed operations, administration, and maintenance (OAM) functionality for hardware and software. The system includes a first shelf that includes first hardware and software components, an OAM module for providing an OAM function, and a first hardware platform interface (HPI) daemon for communicating OAM-related information between the first hardware components and the OAM module. The system also includes a second shelf that includes second hardware and software components, and a second HPI daemon for communicating OAM-related information between the second hardware components and the OAM module. The system also includes a simple network management protocol (SNMP) manager for providing an SNMP function and an SNMP agent for communicating SNMP-related information between the software components and the SNMP manager.

According to another aspect, the subject matter described herein includes a method for providing distributed operations, administration, and maintenance (OAM) functionality in a multi-shelf processing environment. The method includes monitoring hardware components of a first shelf using a first hardware platform interface (HPI) daemon, monitoring hardware components of a second shelf using a second HPI daemon, and communicating OAM-related information between the first and second HPI daemons and an OAM function.

According to another aspect, the subject matter described herein includes a method for providing distributed operations, administration, and maintenance (OAM) functionality for hardware and software. The method includes monitoring hardware components of a first shelf using a first hardware platform interface (HPI) daemon, communicating OAM-related information between the first HPI daemon and an OAM function, monitoring software components of the first shelf using a first simple network management protocol (SNMP) agent, and communicating SNMP-related information between the first SNMP agent and an SNMP manager. The method also includes monitoring hardware components of a second shelf using a second HPI daemon, communicating OAM-related information between the second HPI daemon and the OAM function, monitoring software components of the second shelf using a second SNMP agent, and communicating SNMP-related information between the second SNMP agent and the SNMP manager.

The subject matter described herein for providing a distributed HPI architecture may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, application specific integrated circuits, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

In accordance with the subject matter disclosed herein, methods, systems, and computer program products are provided for a distributed HPI architecture.

Figure 1:
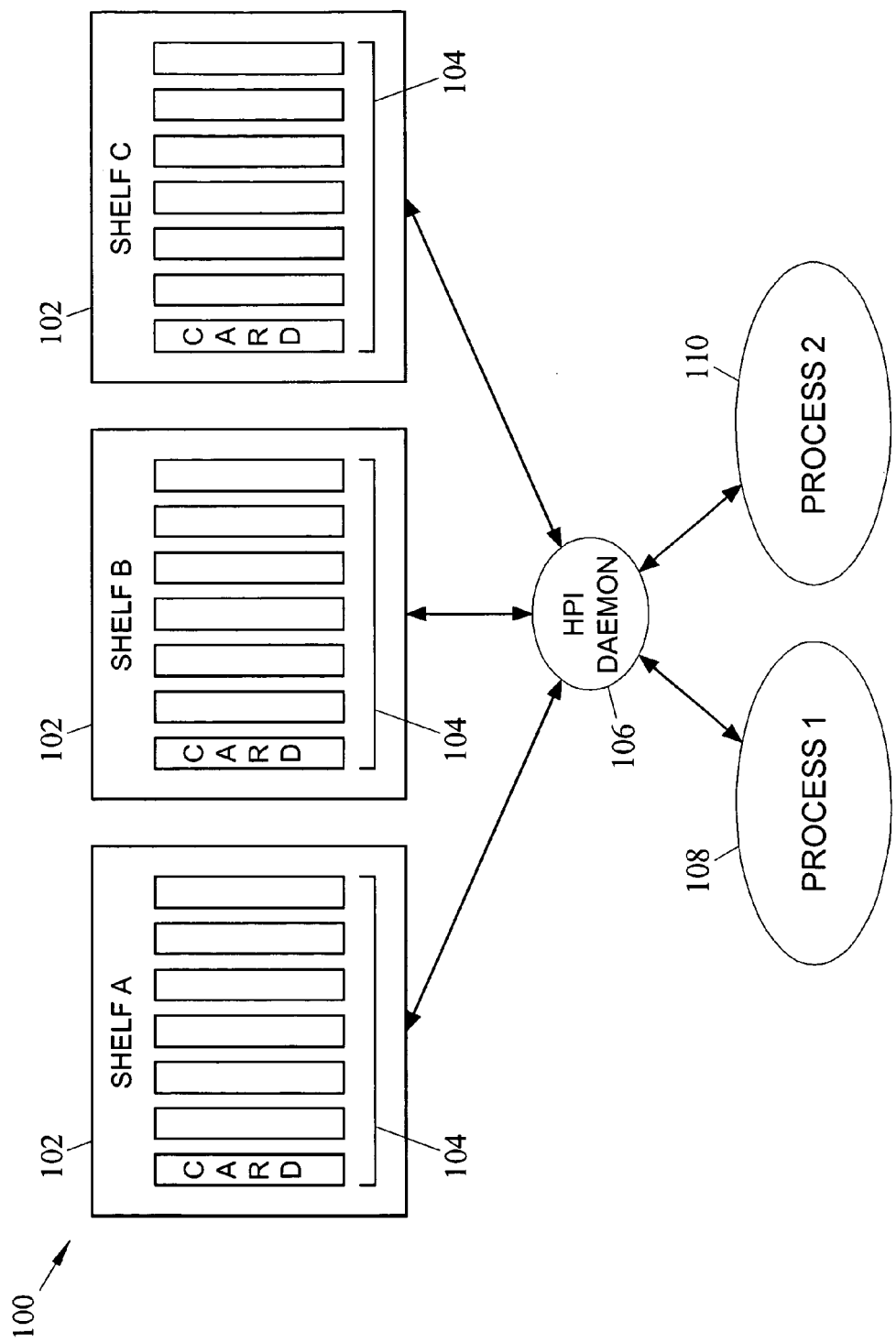
FIG. 1 is a block diagram illustrating a conventional OAM subsystem architecture.
Figure 2:
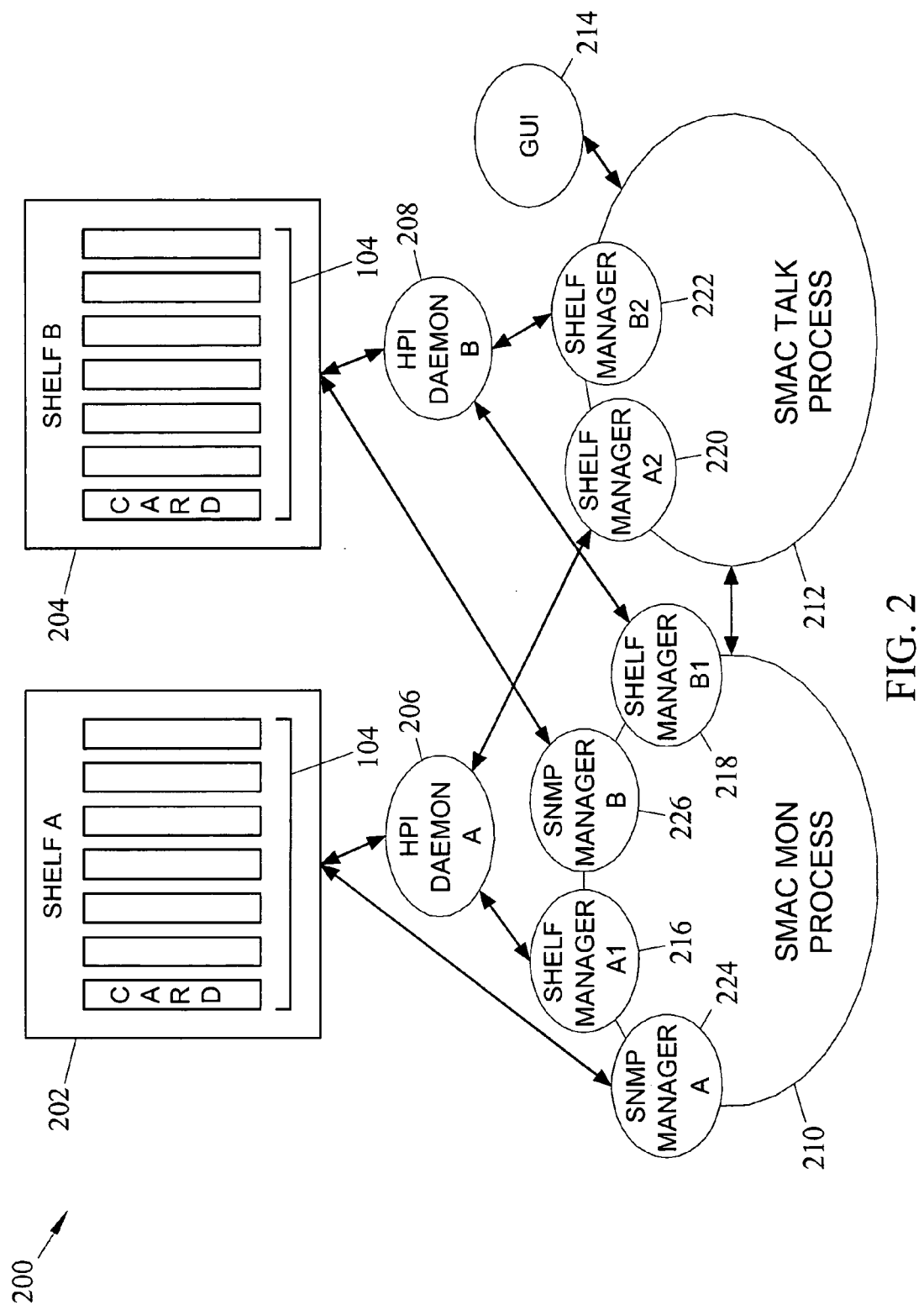
FIG. 2 is a block diagram illustrating an exemplary distributed HPI architecture according to an embodiment of the subject matter described herein.

FIG. 2 is a block diagram illustrating an exemplary distributed HPI architecture in accordance with an embodiment of the subject matter described herein. In FIG. 2, multi-shelf, distributed HPI system 200 may include two shelves, shelf A 202 and shelf B 204, each of which may include cards 104 which may perform various functions. System 200 may include multiple instances of the HPI daemon; two are shown in FIG. 2 as HPI daemon A 206 and HPI daemon B 208. In one embodiment, each daemon may communicate with a single shelf, and each shelf may communicate with a single daemon. In another embodiment, multiple HPI daemons may serve multiple shelves in a load sharing manner. In another embodiment, multiple HPI daemons are used, but each daemon may serve multiple shelves. In another embodiment, a single shelf may be served by multiple HPI daemons. In FIG. 2, HPI daemon A 206 communicates with shelf A 202 and HPI daemon B 208 communicates with shelf B 204. Examples of systems which may embody the subject matter described herein include Internet protocol multimedia subsystem (IMS) network elements and IMS cluster nodes.

By using a separate daemon for each shelf, some disadvantages of a conventional HPI implementation are overcome; for example, a new shelf, and a new corresponding daemon, may be added to system 100 without affecting the other shelves in the system. Also, providing multiple HPI daemons may avoid the system OAM bottleneck condition that may occur when there is only one centralized HPI daemon. Multi-shelf processing systems may be more easily scaled, and may be scaled to larger capacities than are possible with only a centralized HPI daemon.

Each daemon communicates OAM-related information to and from one or more OAM processes. In FIG. 2, two exemplary OAM processes are shown: a system management and configuration (SMAC) monitor process, SMACMon 210, and a SMAC communication process, SMACTalk 212. Collectively, SMACMon 210 and SMACTalk 212 may monitor and control the hardware components of system 200. For example, SMACMon 210 may query the status of hardware components of system 200 or of the system as a whole, through a query/response interaction with the appropriate HPI daemon. SMACMon 210 may perform other monitor and control functions, such as getting a list of all cards currently in system 200, getting information about a card or cards, and sending configuration commands, for example. SMACMon 210 may receive unsolicited status, alarm, or log information from a shelf via that shelf's HPI daemon. SMACTalk 212 is generally responsible for facilitating the communication of commands to hardware components on a shelf via that shelf's HPI daemon. SMACTalk 212 may be the primary interface to a GUI 214, and may also have a CLI (not shown). GUI 214 may be a web interface, such as an Apache web server running a scripting language such as PERL or PHP and running a database such as MySQL, through which a user or operator may monitor and control system 200. SMACTalk 212 may be used primarily for issuing commands that don't require interaction with the user, such as reboot, suspend, activate, for example, while SMACMon 210 may be used for commands from which a response is expected, or which are more interactive in nature, such as reporting information about cards on a shelf, retrieving event logs, getting or setting configuration information, and similar. When a user monitoring or controlling system 200 via GUI 214 issues a request that expects a response, SMACTalk 212 may pass the request to SMACMon 210, which may execute the appropriate queries and collect the responses. SMACMon 210 may then forward the appropriate information to SMACTalk 212, which conveys the response to the user via GUI 214. Multiple OAM processes may communicate OAM-related information to each other.

OAM processes, such as SMACMon 210 and SMACTalk 212, may create a thread called a shelf manager for each shelf in the system. A shelf manager may communicate OAM-related information to and from its shelf via the HPI daemon that is associated with that shelf. In one implementation, a shelf manager may communicate with one shelf through one HPI daemon. SMACMon 210 creates two shelf managers: shelf manager A1 216, which communicates with shelf A 202 via HPI daemon A 206, and shelf manager B1 218, which communicates with shelf B 204 via HPI daemon B 208. SMACTalk 212 also creates two shelf managers, one for each shelf, shelf manager A2 220, which communicates with shelf A 202 via HPI daemon A 206, and shelf manager B2 222, which communicates with shelf B 204 via HPI daemon B 208.

To overcome a limitation of a conventional HPI implementation, the client side library that is provided with the HPI daemon and that is used by the OAM processes may be modified as follows: the session information (the connection to the daemon) may be changed to be thread-specific, so that each thread on the client side maintains a separate connection to the daemon. If multiple threads are attached to the same daemon, they may each have separate connections. This allows the client to communicate with as many daemons as needed, without one thread's connection to its daemon interfering with or being interfered by another thread's connection to its daemon. In FIG. 2, two threads, shelf manager A1 216 and shelf manager B1 218 in OAM client SMACMon 210, maintain separate connections to HPI daemon A 206 and HPI daemon B 208, respectively. Also, steps must be taken in order to guarantee that each HPI daemon uses a unique IP address and port. For example, if an HPI daemon reads environment variables at execution time to determine the IP address and port to be used, two HPI daemons may be executed by setting the environment variables to a first IP address and port value, executing one HPI daemon, then setting the environment variables to a second IP address and/or port value, and executing another HPI daemon.

In some embodiments, system 200 may include a software OAM subsystem roughly analogous in function and purpose to the HPI architecture. An example software OAM subsystem may use the simple network management protocol (SNMP). SNMP is used for monitoring network-attached devices for conditions that warrant administrative attention. Typical functions of SNMP include monitoring device uptimes, taking inventory of operating system (OS) and software versions, and collecting interface information. In some embodiments, each card may include its own simple network management protocol (SNMP) agent. In other embodiments, each shelf may include one SNMP agent; each SNMP agent may serve a single software component, or each may serve multiple software components; each software component may be served by a single SNMP agent, or each may be served by multiple SNMP agents. In some embodiments, SNMP agents may communicate SNMP-related information with each other, in a load-sharing manner, for example.

In some embodiments, each SNMP agent may communicate with a single SNMP manager. In other embodiments, multiple SNMP managers may be used; each manager may be a client of a single agent, or each may be a client of multiple agents; each manager may serve a single shelf, or each may serve multiple shelves; each agent may serve a single manager, or each may serve multiple managers; and each shelf may be served by a single manager, or each may be served by multiple managers. Multiple SNMP managers may communicate SNMP-related information to each other, in a load-sharing manner, for example. In FIG. 2, SNMP manager A 224 may communicate SNMP-related information to and from cards in shelf A 202, and SNMP manager B 226 may communicate SNMP-related information to and from cards in shelf B 204. In some embodiments, independent process threads may be created for communicating OAM-related information between an agent and an OAM function. In FIG. 2, for example, process SMACMon 210 may create and maintain independent process threads SNMP manager A 224 and SNMP manager B 226.

The use of both HPI and SNMP protocols in the same system overcomes the disadvantages of using just one or the other. As a hardware-oriented protocol, HPI is not ideally suited for software management and control. As a software-oriented protocol, SNMP is not ideally suited for hardware management and control. By using both protocols, the strengths of each protocol can offset the weaknesses of the other. An additional advantage to using HPI and SNMP together is that software and hardware OAM functions may be independent of each other; a change in hardware may not require a change in the SNMP component, and a change in software may not require a change in the HPI daemon.

By creating a thread for each shelf, a distributed OAM subsystem may be employed to take further advantage of the benefits provided by the distributed HPI architecture: increased modularity (e.g., each shelf communicates with and through its own OAM or SNMP thread, which can be activated, deactivated, or modified without affecting the other shelves) and scalability (e.g., additional shelves do not further burden existing processes, but instead are associated with a new process created for the particular shelf).

Figure 3:
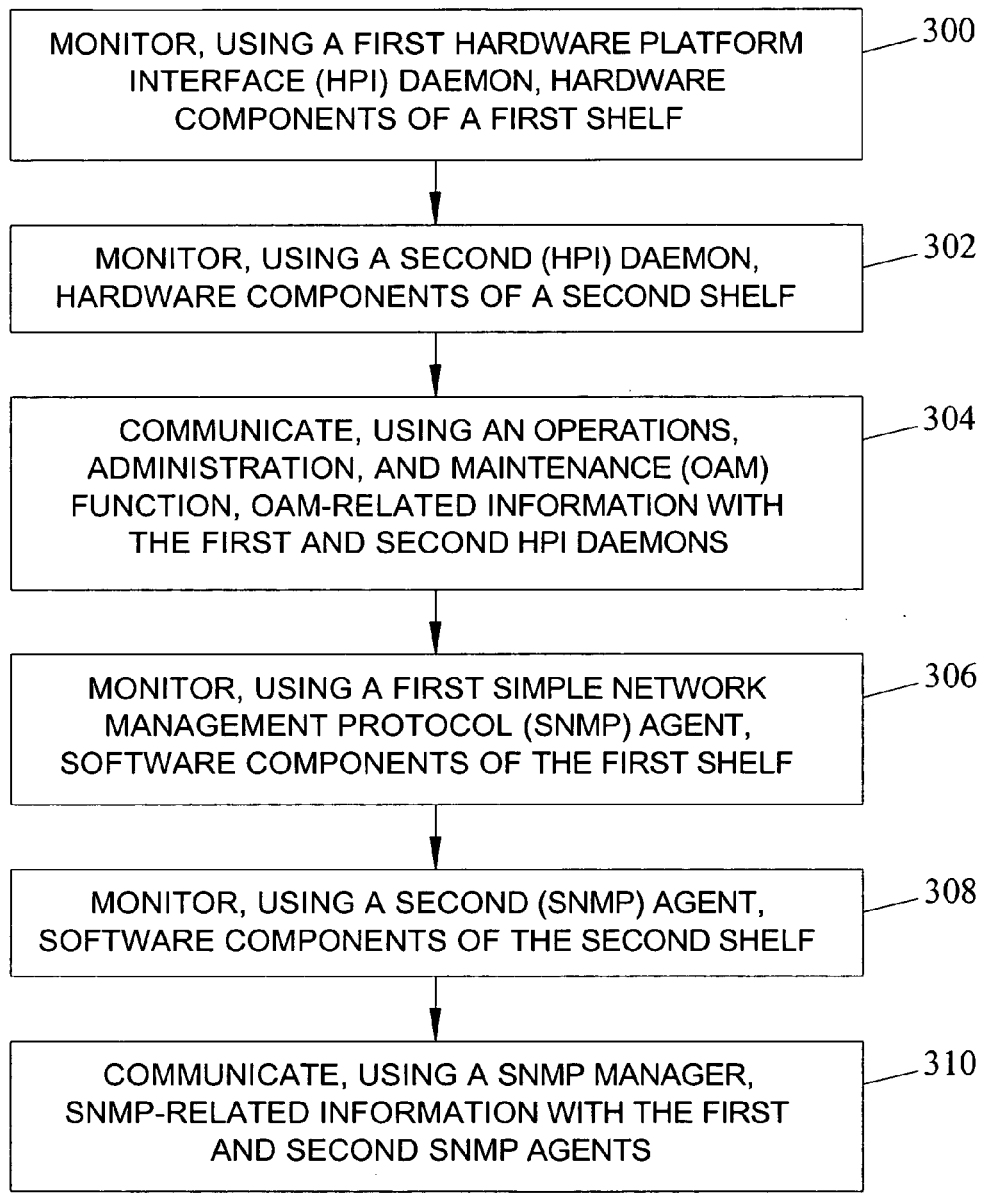
FIG. 3 is a flow chart illustrating an exemplary process for providing distributed operations, administration, and maintenance (OAM) functionality in a multi-shelf processing environment according to an embodiment of the subject matter described herein.

FIG. 3 is a flow chart illustrating an exemplary process for providing distributed operations, administration, and maintenance (OAM) functionality in a multi-shelf processing environment according to an embodiment of the subject matter described herein. In step 300, a first HPI daemon is used to monitor hardware components of a first shelf. In step 302, a second HPI daemon is used to monitor hardware components of a second shelf. In step 304, an OAM function is used to communicate OAM-related information to and from the hardware components on the first and second shelves via the first and second HPI daemons, respectively. In step 306, a first SNMP agent is used to monitor software components of the first shelf. In step 308, a second SNMP agent is used to monitor software components of the second shelf. In step 310, an SNMP manager is used to communicate OAM-related information to and from the software components on the first and second shelves via the first and second SNMP agents, respectively.

In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, application specific integrated circuits, and downloadable electrical signals. In addition, a computer program product that implements the subject matter described herein may be located on a single device or computing platform or may be distributed across multiple devices or computing platforms.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for providing distributed operations, administration, and maintenance (OAM) functionality in a multi-shelf processing environment, the system comprising:
   (a) a first shelf including first hardware components and a second shelf including second hardware components;
   (b) a first OAM module for providing an OAM function;

(c) a first hardware platform interface (HPI) daemon for communicating OAM-related information between the first hardware components and the first OAM module, wherein the first HPI daemon provides a client side library to the first OAM module through which the first OAM module can perform monitoring, control, and management of the first hardware components; and (d) a second HPI daemon for communicating OAM-related information between the second hardware components and the first OAM module, wherein the second HPI daemon provides a client side library to the first OAM module through which the first OAM module can perform monitoring, control, and management of the second hardware components.

2. The system of claim 1 comprising a third shelf including third hardware components, wherein the first HPI daemon communicates OAM-related information between the third hardware components and the first QAM module.

3. The system of claim 1 wherein the OAM function comprises at least one of a component status query function, a component identification query function, a component configuration function, a logging function, an alarm detection and response function, a command function, a graphical user interface function, and a command line interface function.

4. The system of claim 1 comprising a third HPI daemon for communicating OAM-related information between the first hardware components and the first OAM module.

5. The system of claim 1 wherein the first HPI daemon is adapted to communicate OAM-related information between the second hardware components and the first OAM module and wherein the second HPI daemon is adapted to communicate OAM-related information between the first hardware components and the first OAM module.

6. The system of claim 5 wherein the first and second HPI daemons operate in a load-sharing manner.

7. The system of claim 1 comprising an Internet protocol multimedia subsystem (IMS) cluster node, wherein the first and second shelves, the first OAM module, and the first and second HPI daemons are components of the IMS cluster node.

8. A system for providing distributed operations, administration, and maintenance (OAM) functionality in a multi-shelf processing environment, the system comprising:

(a) a first shelf including first hardware components and a second shelf including second hardware components;
(b) a first OAM module for providing an OAM function;
(c) a first hardware platform interface (HPI) daemon for communicating OAM-related information between the first hardware components and the first OAM module; and
(d) a second HPI daemon for communicating OAM-related information between the second hardware components and the first OAM module, wherein the first OAM module includes a plurality of process threads for communicating OAM-related information with the first and second HPI daemons and wherein at least one of the plurality of threads communicates with a different HPI daemon than the other threads.

9. The system of claim 8 wherein the threads include a first thread for communicating OAM-related information with the first shelf and a second thread for communicating OAM-related information with the second shelf.

10. A system for providing distributed operations, administration, and maintenance (OAM) functionality in a multi-shelf processing environment, the system comprising:

(a) a first shelf including first hardware components and a second shelf including second hardware components;

(b) a first OAM module for providing an OAM function;
(c) a first hardware platform interface (HPI) daemon for communicating OAM-related information between the first hardware components and the first OAM module;
(d) a second HPI daemon for communicating OAM-related information between the second hardware components and the first OAM module; and
(e) a second OAM module for providing an OAM function, wherein the first HPI daemon communicates OAM-related information between the first hardware components and the second OAM module, and wherein the second HP daemon communicates OAM-related information between the second hardware components and the second OAM module.

11. The system of claim 10 wherein the first and second OAM modules communicate OAM-related information to each other.

12. A system for providing distributed operations, administration, and maintenance (OAM) functionality in a multi-shelf processing environment, the system comprising:

(a) a first shelf including first hardware components and a second shelf including second hardware components;
(b) a first OAM module for providing an OAM function;
(c) a first hardware platform interface (HPI) daemon for communicating OAM-related information between the first hardware components and the first OAM module;
(d) a second HPI daemon for communicating OAM-related information between the second hardware components and the first OAM module; and (e) an Internet protocol multimedia subsystem (IMS) network element, wherein the first and second shelves, the first OAM module, and the first and second HPI daemons are components of the IMS network element.

13. A system for providing distributed operations, administration, and maintenance (OAM) functionality for hardware and software, the system comprising:

(a) a first shelf including first hardware components and first software components;
(b) a first OAM module for providing an OAM function;
(c) a first hardware platform interface (HPI) daemon for communicating OAM-related information between the first hardware components and the first OAM module;
(d) a second shelf including second hardware components and second software components;
(e) a second HPI daemon for communicating OAM-related information between the second hardware components and the first OAM module;
(f) a first simple network management protocol (SNMP) manager for providing an SNMP function; and
(g) a first SNMP agent for communicating SNMP-related information between the first software components and the first SNMP manager.

14. The system of claim 13 wherein the OAM function comprises at least one of a component status query function, a component identification query function, a component configuration function, a logging function, an alarm detection and response function, a command function, a graphical user interface function, and a command line interface function.

15. The system of claim 13 comprising a second SNMP agent for communicating SNMP-related information between the first software components and the first SNMP manager.

16. The system of claim 13 comprising a second SNMP manager for providing an SNMP function, and wherein the first SNMP agent communicates SNMP-related information between the first software components and the second SNMP manager.

17. The system of claim 16 wherein the first and second SNMP managers communicate SNMP-related information to each other.

18. The system of claim 13 comprising a second SNMP agent for communicating SNMP-related information between the second software components and the first SNMP manager.

19. The system of claim 18 wherein the first SNMP agent communicates SNMP-related information to and receives SNMP-related information from the second software components, and wherein the second SNMP agent communicates SNMP-related information to and receives SNMP-related information from the first software components.

20. The system of claim 19 wherein the first and second SNMP agents operate in a load-sharing manner.

21. The system of claim 18 comprising a second SNMP manager for providing an SNMP function, and wherein the first SNMP agent communicates SNMP-related information to and receives SNMP-related information from the second SNMP manager, and wherein the second SNMP agent communicates SNMP-related information to and receives SNMP-related information from the first SNMP manager.

22. The system of claim 21 wherein the first and second SNMP managers communicate SNMP-related information to each other.

23. The system of claim 18 wherein the first OAM module includes a plurality of process threads for communicating SNMP-related information with the first and second SNMP agents, and wherein at least one of the plurality of threads communicates with a different SNMP agent than the other threads.

24. The system of claim 23 wherein the threads include a first thread for communicating SNMP-related information with the first shelf and a second thread for communicating SNMP-related information with the second shelf.

25. The system of claim 23 wherein at least one thread for communicating SNMP-related information comprises an SNMP manager.

26. A method for providing distributed operations, administration, and maintenance (OAM) functionality in a multi-shelf processing environment, the method comprising:
   (a) monitoring, using a first hardware platform interface (HPI) daemon, hardware components of a first shelf;
   (b) monitoring, using a second HPI daemon, hardware components of a second shelf; and
   (c) communicating, using a first OAM function, OAM-related information between the first OAM function and the first and second HPI daemons1 wherein the first HPI daemon provides a client side library to the first OAM function for monitoring, controlling, and managing the hardware components of the first shelf and wherein the second HPI daemon provides a client side library to the first OAM function for monitoring, controlling, and managing the hardware components of the second shelf.

27. The method of claim 26 comprising communicating OAM-related information between the first and second HPI daemons.

28. The method of claim 26 comprising monitoring, using the first HPI daemon, hardware components of a third shelf.

29. The method of claim 26 comprising monitoring, using a third HPI daemon, hardware components of the first shelf.

30. The method of claim 26 comprising monitoring, using the second HPI daemon, hardware components of the first shelf and monitoring, using the first HPI daemon, hardware components of the second shelf.

31. The method of claim 30 wherein the first and second HPI daemons operate in a load-sharing manner.

32. The method of claim 26 comprising communicating, using a plurality of process threads instantiated by the first OAM function, OAM-related information between the first OAM function and the first and second HPI daemons, wherein at least one of the plurality of threads communicates with a different HPI daemon than the other threads.

33. The method of claim 32 wherein communicating OAM-related information includes communicating, using a first thread, OAM-related information with the first shelf, and communicating, using a second thread, OAM-related information with the second shelf.

34. The method of claim 26 comprising communicating, using a second OAM function, OAM-related information between the second OAM function and the first and second HPI daemons.

35. The method of claim 34 comprising communicating OAM-related information between the first and second OAM functions.

36. The method of claim 26 wherein using the first OAM function includes performing at least one of a component status query function, a component identification query function, a component configuration function, a logging function, an alarm detection and response function, a command function, a graphical user interface function, and a command line interface function.

37. A method for providing distributed operations, administration, and maintenance (OAM) functionality in a multi-shelf processing environment, the method comprising:
   (a) monitoring, using a first hardware platform interface (HPI) daemon, first hardware components of a first shelf;
   (b) communicating, using a first OAM function, OAM-related information between the first OAM function and the first HPI daemon;
   (c) monitoring, using a second HPI daemon, second hardware components of a second shelf;
   (d) communicating, using the first OAM function, OAM-related information between the first OAM function and the second HPI daemon;
   (e) monitoring, using a first simple network management protocol (SNMP) agent, first software components of the first shelf; and
   (f) communicating, using a first SNMP manager, SNMP-related information between the first SNMP manager and the first SNMP agent.

38. The method of claim 37 comprising communicating, using a second SNMP agent, SNMP-related information between the first software components and the first SNMP manager.

39. The method of claim 37 comprising communicating, using a second SNMP manager, SNMP-related information between the second SNMP manager and the first SNMP agent.

40. The method of claim 39 comprising communicating SNMP-related information between the first and second SNMP managers.

41. The method of claim 37 comprising:
   (a) monitoring, using a second SNMP agent, second software components of the second shelf; and
   (b) communicating, using the first SNMP manager, SNMP-related information between the first SNMP manager and the second SNMP agent.

42. The method of claim 41 comprising:
   (a) communicating, using the first SNMP agent, SNMP-related information between the first SNMP agent and the second software components; and (b) communicating, using the second SNMP agent, SNMP-related information between the second SNMP agent and the first software components.

43. The method of claim 42 wherein the first and second SNMP agents operate in a load-sharing manner.

44. The method of claim 41 comprising communicating, using a second SNMP manager, SNMP-related information between the second SNMP manager and the first and second SNMP agents.

45. The method of claim 44 comprising communicating SNMP-related information between the first and second SNMP managers.

46. The method of claim 41 comprising communicating, using a plurality of process threads instantiated by the first SNMP manager, SNMP-related information between the first SNMP manager and the first and second SNMP agents, wherein at least one of the plurality of threads communicates with a different SNMP agent than the other threads.

47. The method of claim 46 wherein communicating SNMP-related information includes communicating, using a first thread, SNMP-related information with the first shelf, and communicating, using a second thread, SNMP-related information with the second shelf.

48. The method of claim 37 wherein using the first OAM function includes performing at least one of a component status query function, a component identification query function, a component configuration function, a logging function, an alarm detection and response function, a command function, a graphical user interface function, and a command line interface function.

49. A computer program product comprising computer-executable instructions embodied in a non-transitory computer-readable medium for performing steps comprising:
   (a) monitoring, using a first hardware platform interface (HPI) daemon, hardware components of a first shelf;
   (b) monitoring, using a second HPI daemon, hardware components of a second shelf; and
   (c) communicating; using an OAM function, OAM-related information between the first and second HPI daemons, wherein the first HPI daemon provides a client side library to the first OAM function for monitoring, controlling, and managing the hardware components of the first shelf and wherein the second HPI daemon provides a client side library to the first OAM function for monitoring, controlling, and managing the hardware components of the second shelf.

50. A computer program product comprising computer-executable instructions embodied in a non-transitory computer-readable medium for performing steps comprising:
   (a) monitoring, using a first hardware platform interface (HPI) daemon, hardware components of a first shelf;
   (b) monitoring, using a second HPI daemon, hardware components of a second shelf;
   (c) communicating, using an OAM function, OAM-related information between the first and second HPI daemons;
   (d) monitoring, using a first simple network management protocol (SNMP) agent, first software components of the first shelf; and
   (e) communicating, using a first SNMP manager, SNMP-related information between the first SNMP manager and the first SNMP agent.

* * * * *